Inventors:
Thomas A. Banning, Jr., &
Agnes J. Ranseen, Executrix,
Estate of Emil L. Ranseen, Dec'd.

June 1, 1965   T. A. BANNING, JR., ETAL   3,186,707
MAGNETIZABLE TAPE AND THE LIKE, FOR SIGNAL CARRIERS
Original Filed May 4, 1954   5 Sheets-Sheet 4

Inventors:
Thomas A. Banning, Jr., &
Agnes J. Ranseen, Executrix,
Estate of Emil L. Ranseen, Deceased.
by ________ Atty.

June 1, 1965   T. A. BANNING, JR., ETAL   3,186,707
MAGNETIZABLE TAPE AND THE LIKE, FOR SIGNAL CARRIERS,
Original Filed May 4, 1954   5 Sheets-Sheet 5

Note: Since rate of scan across the tape is constant during each scan, the potential developed across the gap (E or E') varies proportionately to the strength of the magnetic field carried by the tape at each point of the path so scanned, during translation.

Inventors:
Thomas A. Banning, &
Agnes J. Ranseen, Executrix,
Estate of Emil L. Ranseen, Dec'd.
by
Atty.

United States Patent Office 3,186,707
Patented June 1, 1965

3,186,707
MAGNETIZABLE TAPE AND THE LIKE,
FOR SIGNAL CARRIERS
Thomas A. Banning, Jr., 5520 South Shore Drive, Chicago 37, Ill., and Emil L. Ranseen, deceased, late of Chicago, Ill., by Agnes J. Ranseen, executrix, Evanston, Ill.; said Agnes J. Ranseen assignor to said Banning
Original application May 4, 1954, Ser. No. 427,428, now Patent No. 2,976,354, dated Mar. 21, 1961. Divided and this application Mar. 9, 1961, Ser. No. 94,649
4 Claims. (Cl. 274—41.4)

This invention relates to improvements in magnetizable tape, and the like, for signal carriers. Specifically, the improvements in such devices, hereinafter disclosed, include such signal carriers as magnetizable tape for tape recorders, and similar signal carriers, used in the storage of signals by magnetizing the surface of such carrier; and subsequent interpretation of the signals thus stored, by suitable interpreting means, such as a magnetic tape recorder, and play-back unit.

This application is a division of the parent application of Thomas A. Banning, Jr., and Emil L. Ranseen, now deceased, for Improvements in Tape Recording and Translating and the Like, Serial No. 427,428, filed May 4, 1954, and to be issued as Letters Patent of the United States No. 2,976,354, to be issued March 21, 1961. In that parent application the herein described embodiments of the magnetizable tape have been disclosed, as well as various embodiments of the recording and translating means which may use such tape as the signal carrier. Accordingly, there are herein included not only the showings and disclosures respecting the magnetizable tape itself, but also, for better understanding of certain of the inventive features respecting the tape itself, there are included in this case, showings of some of the recording and translating means which may be used for producing the recorded signals on such tape, as well as the means for interpreting and translating such recorded signals.

The improvements respecting the magnetizable tape consist in the provision of a thin sheet or foil of highly magnetizable alloy, having a high permeability, low hysteresis, and a low coercive force quality, and capable of being rolled into very thin sheets, while retaining its high ductile quality, such thin sheet or foil, if desired, being provided with a thin backing of high tensile, flexible, substantially non-stretchable material, such sheet or foil and its backing being surface connected together, as by a cementing operation. Such a magnetizable sheet or foil comprises an alloy of molybdenum, nickel, and iron, substantially in the proportions of 4 percent molybdenum, 79 percent nickel, and the balance, iron; and such alloy being known as "4–79 NI." It is conveniently produced and used in thicknesses of much less than one mil (one one-thousandth of an inch). Such thin sheet or foil is mounted and cemented face to face to a sheet of plastic material such as nylon, an example of such nylon backing sheet being a sheet or very fine weave of such plastic, of thickness of the order of one mil, for example. The plastic sheet may, of itself, be of thickness much less than one mil, so that the combined thickness of the tape, including the metal sheet or foil, and the plastic backing, may be not over one mil, if desired.

Such alloy also has the property that the magnetizations of the minute signals placed thereon (or therein), will be held against lateral transit or effect, so that excellent signals of minute size and small strength are well received and retained on such tape; while at the same time, due to the low coercive quality of such alloy, such signals may, when desired, be readily "erased" from the tape.

Tapes embodying the present features may be used for the recording (and play-back) of signals placed on the tape in linear form (lengthwise of the tape), or cross-wise of the tape (lateral scanning), either as curved cross-wise recordings, or otherwise in cross-wise scan. When such cross-wise scans are produced, an area of the tape is used for the records, as distinguished from a narrow linear band of the recordings, such area then being equal to the length of tape over which the cross-scans are produced, multiplied by the width of tape scanned by each cross-wise scan. The parent application, of which this case is a division, shows various embodiments of recorders for producing such cross-wise scans on the tape, and also shows various means for sensing and translating such record carrying scans. For more complete understanding of the features of the present invention, especially the importance of such features when the tapes embodying the present features are used in such recorders, there are included in this divisional case certain embodiments of recorders and play-back units with which the present tapes may be used, by way of example.

When the cross-scans are produced at short intervals along the length of the tape, as is desirable when recording very high speed signals, such for example, as signals for the recording to a television program, it is desirable that the successive cross-scans be individualized as much as possible, to avoid cross-talk, and other improper effects. Accordingly, the recording tape herein disclosed may be provided with crosswise extending fine ridges, formed in the thin sheet or foil of the metal alloy, and spaced from each other along the length of the tape exactly conforming to the lengthwise travel of such tape executed during each recording cycle (one cycle being understood as the interval between commencement of one scan and the commencement of the next scan). Such ridges, when thus prepared, also conform to the shape of the cross-scan, so that during the recording the signals are placed properly on the successive cross-ridges, and so that during translation the playback head will properly receive the magnetic effects previously stored on the ridges of the magnetizable foil. In the hereinafter referred to embodiments of equipment, the recording and translating elements are designed to produce, and afterwards, to sense, signals laid onto the tape in arcuate cross-scans, formed on segments of circular arcs. Accordingly, there are shown as embodiments of tapes which include such ridges of the magnetizable sheet or foil, such forms of ridges extending across the tape, and formed on arcuate recording and sensing plans.

Such ridges, when provided, are of small height, as shown in various of the figures, being thus of the order of one mil in height, or even less. Thus, such ridges do not materially interfere with the reeling and storing operations to which the tape is subjected during and between its uses.

Slight variations in the speed of drive of the tape will necessarily slightly lessen the accuracy of placement of the recordings on the ridges; but unless such speed variations are not accompanied by like rates of the cross-scans, each recording on the tape will be produced on such a ridged scan element. However, when the rate of tape drive is determined by some control other than the control which determines the rates at which the cross-scans are executed, it is evident that any slight change in the rate of tape travel will produce "creep" of the cross-scans executed by the recording element, unless, as would be improbable, both the rate of cross-scans and the rate of tape travel should be varied harmoniously, both as to time, and as to amount, percentagewise. However, when recording such programs as television programs, provision is made for delivering a "synchronizing signal" at the end of each set of lateral deflections of the beam in the kinescope, and provision is also made for effecting a correction of the kinescope's lateral deflections to ensure commencement of each set of lateral deflections correctly.

One feature of the present invention consists in the provision of a recording track on the tape, to which such correction or synchronizing signals are delivered and recorded on the tape, harmoniously with the reception of such synchronizing signals by the recording equipment, so that, when the tape is "played-back," proper synchronizing signals will be delivered from the tape, to the television receiver, to effect corrections exactly in conformity with the correction signals which were emitted by the sending station during the sending out of the original television program.

Additionally to the recordings previously referred to, the tape herein disclosed may be provided with a longitudinally extending track for reception of sound records. Thus, in such case, all three kinds of recordings may be accommodated on the thin sheet or foil hereinbefore disclosed.

Other objects and uses of the invention will appear from a detailed description of the same, which consists in the features of construction and combinations of parts hereinafter described and claimed.

In the drawings:

FIGURE 1 shows a section of tape provided with a magnetizable surface composed of a thin sheet or foil of highly magnetizable material, such as the alloy of molybdenum and nickel and other, known as "4–79 NI" which includes 4 percent molybdenum and 79 percent nickel, such magnetizable sheet or foil being of a thickness of a fraction of one one-thousandth of an inch, and being cemented or otherwise supported on the surface of a thin backing of non-magnetizable material of high tensile strength and little stretch, such as nylon; and in this figure the magnetizable foil has been cut away at the right-hand portion of the figure to reveal such supporting sheet below the foil;

FIGURE 2 shows a view similar to that of FIGURE 28, but in the present case the foil is provided with slight upwardly extending ribs formed along curves and at spacings to exactly correspond to the successive scans to be performed on the tape by magnetic operations, it being intended that these ribs shall register with the air-gap of the signal translating means at the point of impingement of the ultra-violet beam as beam scan proceeds, thus ensuring very close control of the operation; and these ribs may be formed in convenient manner as by passing the foil between suitable forming rollers; or said ribs may be formed by the presence of curved threads extended across the surface of the nylon backing sheet so that by pressing the metal foil firmly against such backing sheet during a cementing operation by use of a yieldable roller, the desired ribs may be produced;

FIGURES 3, 4 and 5 are longitudinal sections taken on the lines 3—3, 4—4, 5—5 of FIGURES 24, 1 and 2, looking in the directions of the arrows;

FIGURE 7 shows a view similar to that of FIGURE 6, but with the scanning head or recording unit in place above the central portion of the length of tape shown in FIGURE 7; and this figure also shows the already produced cross-scans (schematically) by the curved crosswise extending arcuate lines; and this figure also shows the locations of the sound track and of the line of synchronizing signals; and in this figure there is also shown a "pre-magnetizing" means or unit, which, when used, serves to produce a uniform amount of magnetization on the tape, so that a base of magnetization is provided upon which the signals of the subsequent recording are raised, thus ensuring operation on a selected portion of the magnetizing curve of the magnetically responsive material which is used, as for example, on the substantially straight portion of the magnetizing curve;

FIGURE 10 shows a view similar to that of FIGURE 6, but it shows a section of tape carrying magnetically recorded signal variations produced, for example, by recording means such as those shown in FIGURES 7, 8 and 9; and FIGURE 10 also shows magnetically recorded sound track and synchronizing signals;

FIGURE 14 shows a section of tape carrying cross scan recordings of sound signals, which cross scans may be of either radio or audio frequency recordings; and this figure shows the presence of synchronizing signals placed in linear fashion along the tape, but does not show a linear sound track since in the showing of this figure the sound recordings comprise the cross scans already referred to;

In FIGURES 17 and 18 there are not shown any synchronizing signals nor any sound track signal recordings, for purposes of simplicity, but it will be understood that proper provision for such recordings will be included as needed when making recordings of the color signal variations;

FIGURES 19, 20 and 21 do not show any synchronizing signals nor any sound track signal recordings, for purposes of simplicity of showing, but it will be understood that proper provision for such recordings will be included as needed according to the recordings which are being made or sensed;

FIGURE 24 shows a section of the tape, and also shows, on enlarged scale, the two transverse conductors separated from each other to provide the narrow gap to which the ultra-violet beam is focused; and shows these two conductors connected together in their end portions by suitable clips of insulating material so as to produce a self-contained sensing unit; and this figure also shows the cross scans which have been laid down on the tape surface during tape movement towards the right in the figure;

FIGURE 25 shows a fragmentary longitudinal section through the window end portion of a modified form of scanning tube, together with the adjacent portion of the tape, and the two spaced-apart conductors to which the ultra-violet beam is directed; and in this form of construction the tube is provided with a curved window on its lower or tape proximate face, such window being of curvature corresponding to the path of travel of a reflected electron beam, and such window being provided on its inside surface with the proper phosphor deposit for emission of ultra-violet under electron beam excitation; and such curved window also preferably being formed of lens characteristics to bring the ultra-violet beam to focus outside of the envelope, the window being formed of material which is highly transparent to ultra-violet wave lengths; and in this embodiment there is shown a two dynode arrangement within the envelope in positions of such dynodes to receive the electron beam and to direct the secondary radiation step-by-step by a path to the phosphor deposit on the window, with amplification of beam strength at the position of each dynode, as shown in the figure;

FIGURE 26 shows another modification embodying some of the features disclosed in the modification of FIGURE 25; but in the present case the tube end is shown as being provided with conductors extending through the material of the envelope, with dynode arrangements to direct the electron beam, amplified, to such conductors;

FIGURE 27 shows still another modification of the arrangement shown in FIGURE 25; but in the present case there is shown a single dynode directing the beam to a transparent window, with provision for emission of the ultra-violet beam and directing the same through such window;

FIGURE 28 shows a fragmentary horizontal section taken on the line 28—28 of FIGURE 25, looking in the direction of the arrows;

FIGURE 29 shows a fragmentary horizontal section taken on the line 29—29 of FIGURE 26, looking in the direction of the arrows;

FIGURE 30 shows a fragmentary plan view of a modified form of air-gap producing conductor arrangement, in which there is provided a supplemental conductor extending along the air-gap path and slightly above the two previously mentioned conductors, said supplemental conductor being connected to one terminal of the modified arrangement, and the two original conductors being connected together and to the other terminal of such modified arrangement; and the ultra-violet beam acting at both sides of such supplemental conductor simultaneously; and FIGURE 31 shows a fragmentary vertical section through the modified arrangement of FIGURE 30, taken on the line 31—31, looking in the direction of the arrows.

Reference is first made to FIGURES 1, 2, 3, 4 and 5 in which is shown one embodiment of the novel form of the magnetic recording tape, and a modification of such embodiment. It is here mentioned that in these figures the cross-scans or locations of such scans are shown in arcuate form. However, the invention is not limited in its fundamental features to such cross scanning recording. Furthermore, although in such figures the only scans which have been indicated are of the cross scanning or lateral scanning type, it is to be understood that the tape herein disclosed, may also be used for lineal scanning along or parallel to the longitudinal axis of the tape. In fact, in various of the figures other than FIGURES 1 to 5, inclusive there are shown such longitudinal forms of scan, both for reception of sound track signals, and for reception of synchronizing signals, when such latter kind of signals are needful or desirable.

The thin sheet or foil of highly magnetizable material such as what is known as "4–79 NI," 151, comprising an alloy including substantially 4 percent molybdenum, and substantially 79 percent nickel, and the balance iron, is laid onto the surface of a thin but strong sheet of high tensile strength, such as nylon, 152, the two elements of the tape being secured together as by thin cementing material. This foil of magnetizable material may have a thickness of much less than one one-thousandth inch (one mil), so that the combined thickness of the tape thus produced may be of the order of one or two one-thousandths of an inch (one or two mils). In the embodiment shown in FIGURES 1 and 4 the top or exposed surface of the thin sheet or foil of the magnetizable alloy is shown as being smooth, and not provided with any cross-wise extending ribs or other protuberances.

In FIGURE 3, which is a fragmentary longitudinal section through the central portion of the showing of FIGURE 24, there are shown, in cross-section, the two parallel conducting elements 133 and 134, which provide between them a very short air-gap (legended in FIGURE 3), across which air-gap the ionized conducting narrow zone of air extends, and the ionization of which narrow zone is produced by the focused ultra-violet or ionizing beam delivered by the scanning tube element, as extensively disclosed in the parent application, Serial No. 427,428, Patent No. 2,976,354, to be issued March 21, 1961. It is noted from examination of this FIGURE 3 that said elements 133 and 134 ride smoothly on the surface of the tape (namely, on the top surface which is the exposed surface of the alloy sheet or foil); and, if desired, the bottom faces of these elements 133 and 134 may be provided with a very thin surfacing of enamel, to ensure better riding qualities between the magnetizable sheet or foil and such elements 133 and 134; but it is desirable that the air-gap between the proximate edges of such elements 133 and 134 should be very narrow, and should be very close to the surface of the magnetizable sheet or foil to produce the maximum degree of force transfer between the sheet or foil and the current passing between such elements 133 and 134. In fact, as shown in FIGURE 3 the proximate edges of the elements are beveled downwardly so that the narrowest portions of the proximate edges are very close to the tape surface.

In FIGURE 4 the sheet or foil 151 is shown as raised from the base sheet of the tape, 152, for clarity of showing of the relationship between such two sheets. The element 152 is a convenient carrier for the very thin sheet or foil of magnetizable material, and to give added strength and permanence to the tape produced from both such elements. Conveniently, but not necessarily, the backing sheet may be made of plastic; and in such case, nylon possesses a high tensile strength, great flexibility, negligible stretch, and permanence, qualities which it is desirable to have in tapes for the magnetic recording and play-back operations which are produced by the tapes herein disclosed. The backing sheet may be either a fine weave or a continuous sheet as desired.

In FIGURES 2 and 5 there is shown a modification of this thin sheet or foil type of tape, in the sense that there are, in these figures, shown the curved cross ribs 153 formed on the tape and extending across the width to be scanned, and of curvature or form to conform to the scans to be produced, and with the ribs spaced from each other at separations conforming to the scan spacings. These ribs shall extend up from the general surface of the foil only a small amount, probably about one one-thousandth inch (one mil), so that during scanning operations good definition will be assured between the recordings of the successive scans, and to ensure good contact of the sensing element with that portion of the tape surface which is being recorded or sensed.

In connection with the foregoing it is also to be noted that when the scanning element comprises such an arrangement as shown in FIGURES 3 and 24, and elsewhere, the lower surfaces of the conductors 133 and 134 will ride easily on the ribs 153 without material distortion of such ribs, due to the fact that such conductors extend across the full width of tape to be cross-scanned, thus affording ample supporting surface between the top edges of the ribs, and such conductor plates. Even should such ribs eventually become somewhat depressed by repeated play-back operations, still even a minute remnant of the exposed top surfaces of the ribs will greatly improve the transfer of energy between the tape surface and the ionized conducting narrow gap between the proximate edges of such conductors 133 and 134. It is also noted that, by comparing the showings of FIGURES 24 and 3, with the showings of FIGURE 1 and 5, it is seen that the widths of such conductor plates 133 and 134 (measured lengthwise of the tape) is as great as the distance between three of the ribs 153, so that each conductor plate is constantly in supporting engagement with at least three of the ribs, although the transfer of energy is localized to the size of the ionized beam focused at an elemental area of the narrow gap between the proximate conductor edges.

It is also to be noted that, since the ribs extend up from the surface of the thin sheet or foil of alloy metal, such alloy having a high degree of flexibility, it is possible to wind such a tape, provided with such minute ridges, on the conventional forms and sizes of tape reels without trouble, and with only a slight diminution of the length of tape which can be reeled on a reel of given size. This is true since the radial dimension of such a rib is only a minute fraction of the radius of wind of such tape on the reel, and since the height of the rib is only a fraction of the thickness of the sheet of alloy metal and its backing sheet.

In FIGURES 7, 11, 15 and 16 there are shown several embodiments of recording and play-back equipment with which the tape improvements of the present application are conveniently usable. Specifically, each of such illustrated embodiments includes an electron beam element 116, or 166 or 167 (FIGURE 16), of which the electron beam is laterally deflectable under conventional yoke control; each such electron beam element being provided with a phosphor or other surface against which the electron beam impinges, such phosphor surface being of a nature such that, under electron beam excitation a secondary beam of ionizing wave lengths is emitted; and each such electron beam element being provided with a surface or wall or window through which such ionizing beam is transferred by transparency of the window to such ionizing wave lengths. Specifically, the wave lengths are within the ultra-violet range, but not necessarily limited to such specific range.

When using the tapes embodying the present invention with such forms of scanning element, the scanning element is mounted stationary in such position with respect to the path of tape travel that the conductors between which the ionizing beam delivered from the electron beam element are brought to focus, are very close to the surface of the tape, to thus enhance the energy transfer effect between such parts.

In FIGURES 25, 26, 27, 28 and 29 there are also shown means to amplify the effects produced by the electron beam, to proportionately amplify the recording or sensing effects transferred between the elements.

In FIGURES 25, 27, 30, 31, 22 and 23 there are shown various details of the two conductors between which the air-gap to be ionized is formed, including, in FIGURE 31 a modified arrangement of such conductors, which includes the provision of a third, central conductor extending along the medial line of the air-gap, with provision for connecting the two outside conductors together as one pole of a circuit, and provision for connecting the third, central conductor to the other pole of the circuit.

In FIGURES 26 and 29 there is shown a modification of the lateral scanning operation, under which modification the electron beam within the envelope successively impinges on the inner ends of a series of closely spaced conductors which extend through the material of the envelope to positions close to the surface of the tape, for transfer of energy effects between the interior of the envelope and such tape surface.

Figures 22, 23:
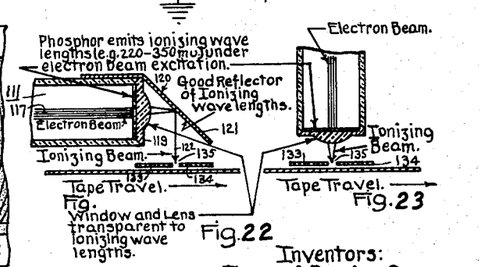
FIGURE 22 shows, on enlarged scale, as compared to other figures, a detail section of one form of window end of the scanning tube which may be used in connection with the recording and scanning operations; such tube end being shown as provided with the phosphor surface excitable by the electron beam to produce the ultra-violet radiation; and the window being shown as including a lens arrangement for concentrating the ultra-violet into a beam transmittable through the material of the window; this figure also showing the ultra-violet reflector and the two gap-producing conductors close to the tape surface; the tube arrangement shown in this figure being one in which the tube envelope is parallel to the tape surface.
FIGURE 23 shows a view similar to that of FIGURE 22; but for the case of a vertically extending tube.

In FIGURE 23 there is shown a modification in which the electron beam element is placed vertically with respect to the tape surface, instead of parallel to such surface as in various of the other illustrated embodiments. This vertical arrangement avoids the need of providing a reflector to bring the direction of the ionizing beam towards the tape surface; but in this connection it is recalled that in the arrangements shown in FIGURES 25, 26 and 27 the dynodes themselves provide for change in the direction of the beam which is finally delivered to the window (or to the conductors, as in FIGURE 26), so that a further reflector is not needed to produce the desired direction of emission of the beam from the envelope.

Figure 19:
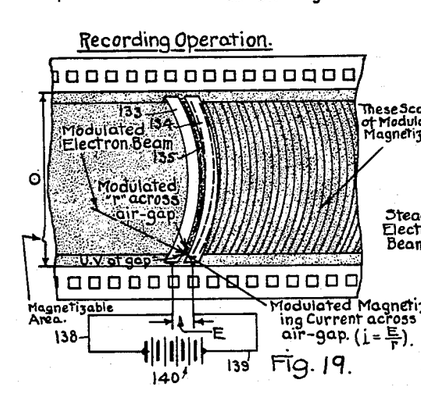
FIGURE 19 shows a section of tape, together with the two gap-producing conductors, the arrangement being intended for producing the cross scans on the tape by magnetic recording operations, such recorded cross scans being shown in that portion of the tape which has passed the location of the air-gap; and this figure shows, schematically, one simple circuit arrangement whereby the necessary magnetic effects may be produced adjacent and close to the surface of the tape which surface is of magnetizable material, with provision whereby the strengths of the recorded magnetizations will be proportional to the strengths of the electron beam at all locations of the recorded scan.
Figure 20:
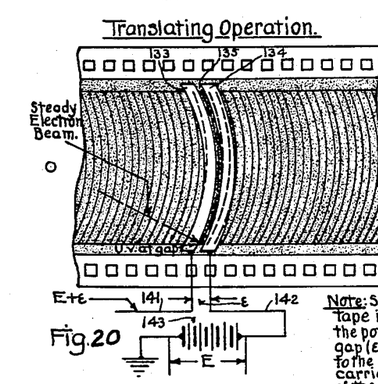
FIGURE 20 shows a section of tape, together with the two gap-producing conductors, the arrangement being intended for sensing and interpreting previously laid down magnetic recordings on cross scans carried by the tape, such cross scans being shown on the tape both in advance of the sensing location and behind such location since the tape is travelling along; and this figure shows, schematically, one simple circuit arrangement whereby the necessary sensed effects are produced corresponding to the strengths of the magnetic recordings along each line of scan, and according to what may be called the "potential" sensing arrangement.
Figure 21:
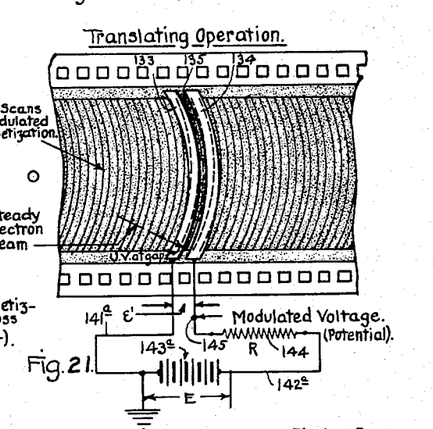
FIGURE 21 shows a section of tape, together with the two gap-producing conductors, the arrangement being intended for sensing and interpreting previously laid down magnetic recordings on cross scans carried by the tape, such cross scans being shown on the tape both in advance of the sensing location and behind such location since the tape is travelling along; and this figure shows, schematically, one simple circuit arrangement whereby the necessary sensed effects are produced corresponding to the strengths of the magnetic recordings along each line of scan, and according to what may be called the "closed circuit" sensing arrangement.

In FIGURES 19, 20 and 21 are shown schematically one form of simple circuitry for producing the desired magnetic effect close to the tape surface, for production of the recording on the tape surface according to the modulation of the beam strength (FIGURE 19), and for sensing the magnetic charges carried by the previously recorded program, and translating the strengths of such charges into corresponding modulations of the electrical effects (FIGURES 20 and 21).

Figure 17:
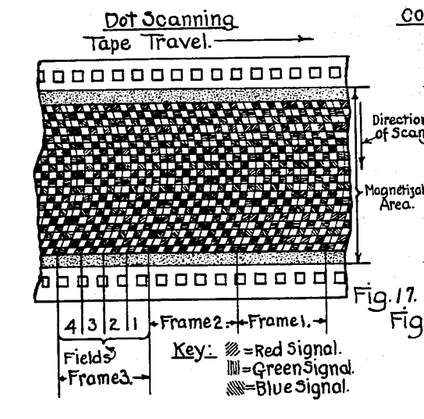
FIGURE 17 shows a section of tape carrying cross scans which are a recording of color television signals produced on the basis of the system of "mixed highs," the "dots" of recordings shown in this figure corresponding to the received signals on said system, and said dots being hatched to indicate the signals which correspond to the three colors, according to the key shown adjacent to this figure; and this figure shows the order of progression of these dot signals for three consecutive "frames," but it will be understood that only twelve scans have been shown for each frame instead of the conventional 525 scans for each frame as actually used.
Figure 18:
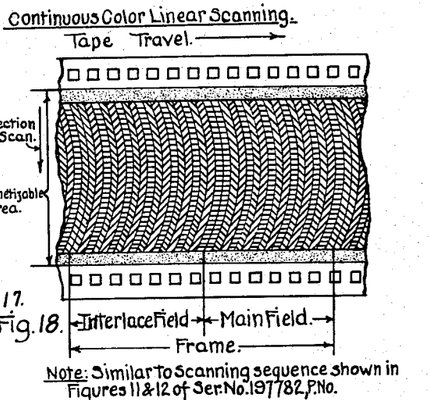
FIGURE 18 shows a section of tape carrying cross scans which are a recording of color television signals produced on the basis of the system of linear color scans, the cross scans of recordings shown in this figure corresponding to the received signals on said system, and said scans being hatched to indicate the scans which correspond to the three colors; and this figure shows the order of progression of these scan signals for a main field and an interlace field, but it will be understood that only eighteen scans have been shown for each such field instead of the conventional 263 scans for the main field and 262 scans for the interlace field as actually used.

In FIGURES 17 and 18 there are shown, schematically, how the signals corresponding to a three color television program may be recorded on tapes including the present inventive features; FIGURE 17 showing how the successive three color signals produced during each cross scan may be individually recorded in proper sequence of such signals; and FIGURE 18 showing how successive full linear scans of each primary color may be recorded in proper line sequence according to the reception of such signals from the sending station.

Figure 6:
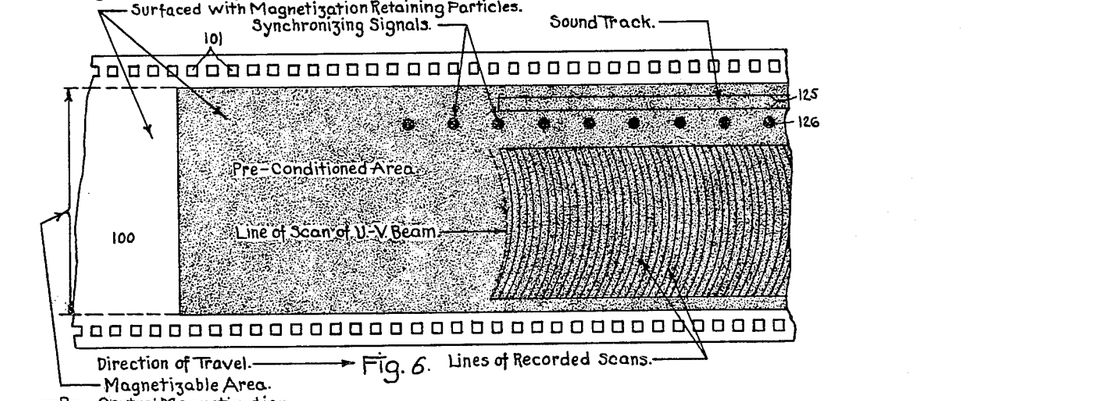
FIGURE 6 shows a face view of a section of tape embodying the features of the present invention, showing the end portion of the magnetizable foil area (non-ribbed) by the stippling, the right-hand portion of such magnetizable foil area (to the right-hand end of the figure), showing, schematically, by the crosswise extending curved lines, the locations of successive scans which have been passed under or against the recording location; and this figure also shows the linear area for production of sound tracks in conventional manner; and also shows, by successive small circles or dots, successive synchronizing signal areas.
Figure 7:
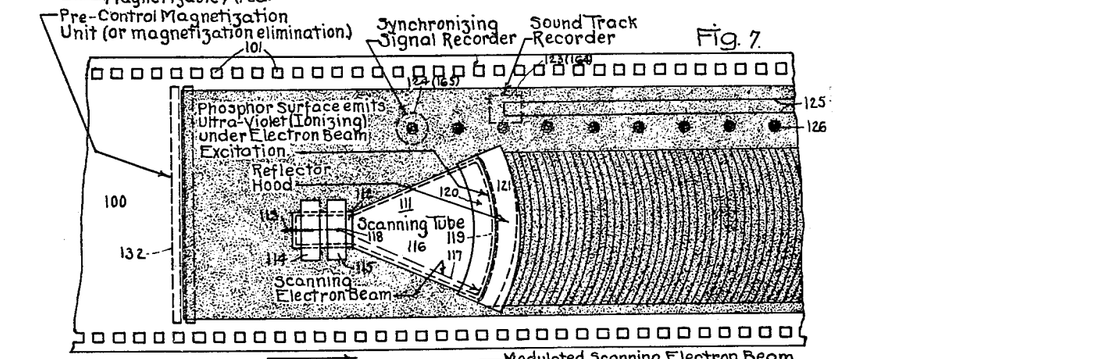
Figures 8, 9:
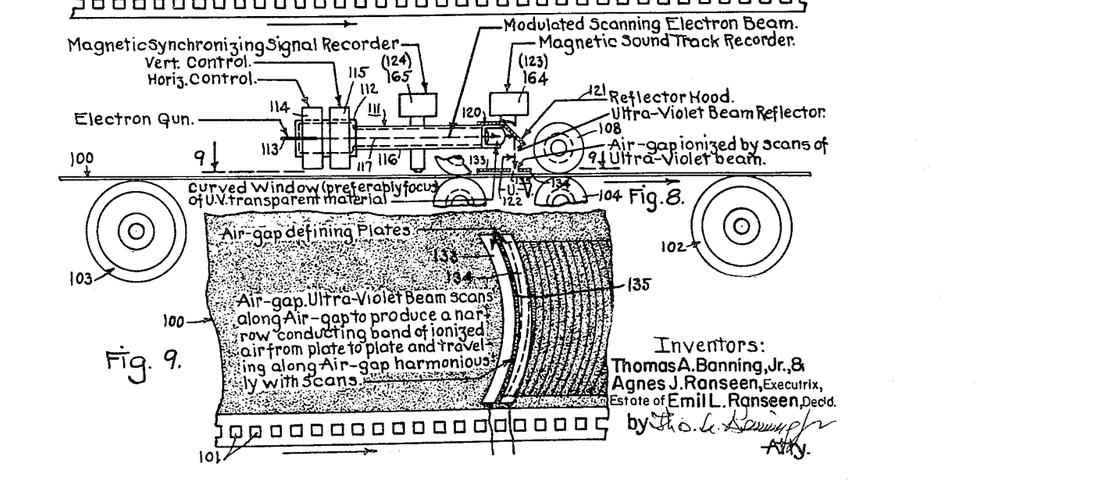
FIGURE 8 shows a side elevation corresponding to FIGURES 6 and 7, the reflector of the ultra-violet beam being shown in section; and this figure also shows in section the two conductors which provide the air-gap which is ionized by the ultra-violet beam directed to and focused at such air-gap to thus produce the controlled conductivity conductor from one side of the gap to the other side, such controlled conductor moving along the gap (in the direction of scan) harmoniously with the scanning movement.
FIGURE 9 shows a fragmentary horizontal section taken on the line 9—9 of FIGURE 8, looking down in the direction of the arrows; and this figure shows a detail of the two gap-producing conductors which are insulated from each other and produce the desired air-gap between them.
Figure 10:
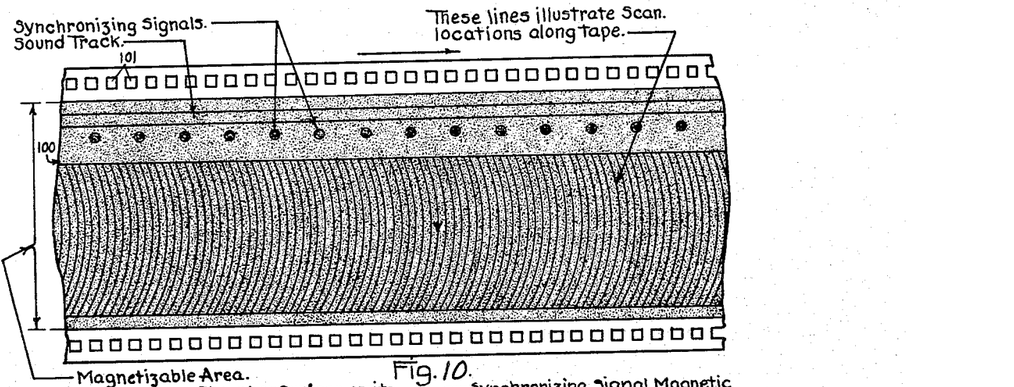
Figure 11:
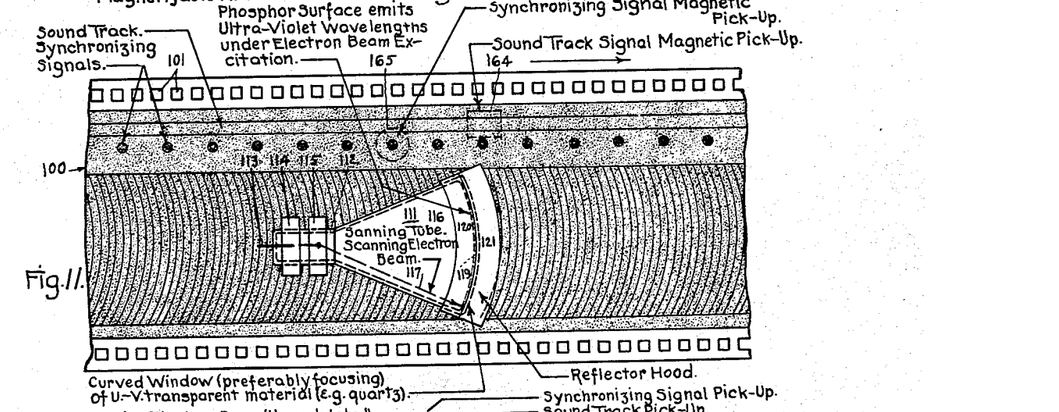
FIGURE 11 shows a view similar to that of FIGURE 10, but with the sensing head or unit in place above the surface of the previously recorded tape.
Figures 12, 13:
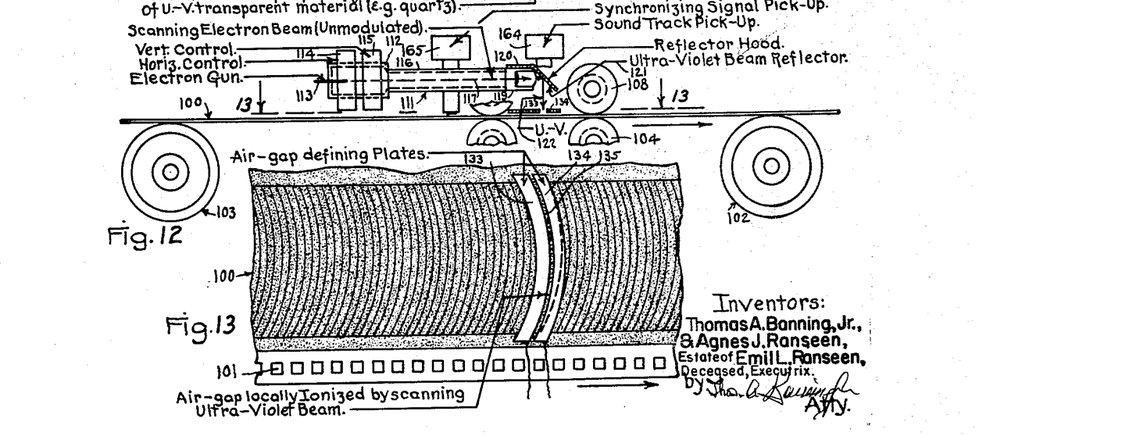
FIGURE 12 shows a side elevation corresponding to FIGURE 11.
FIGURE 13 shows a fragmentary horizontal section taken on the line 13—13 of FIGURE 12, looking in the direction of the arrows, downwardly towards the tape carrying the magnetically recorded signals; and it also shows the two gap-producing conductors which are insulated from each other and produce the desired air gap between them.
Figure 14:
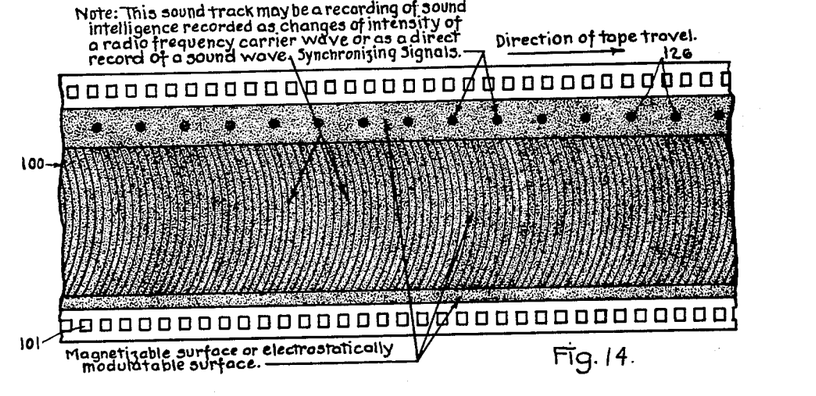
Figure 15:
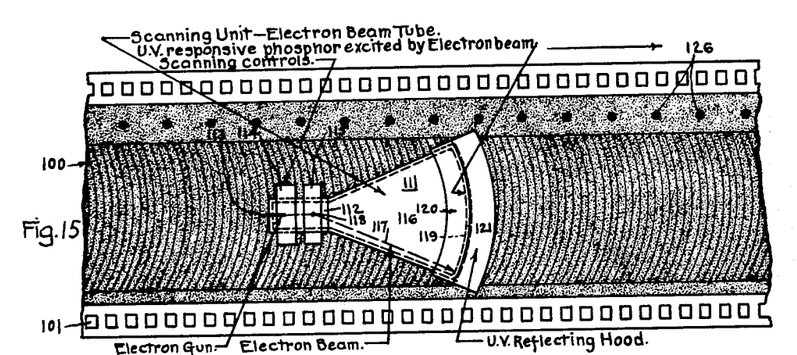
FIGURE 15 shows a plan view corresponding to FIGURE 14, but with the sensing head in place for sensing and signalling according to the sound recordings carried by the tape.
Figure 16:
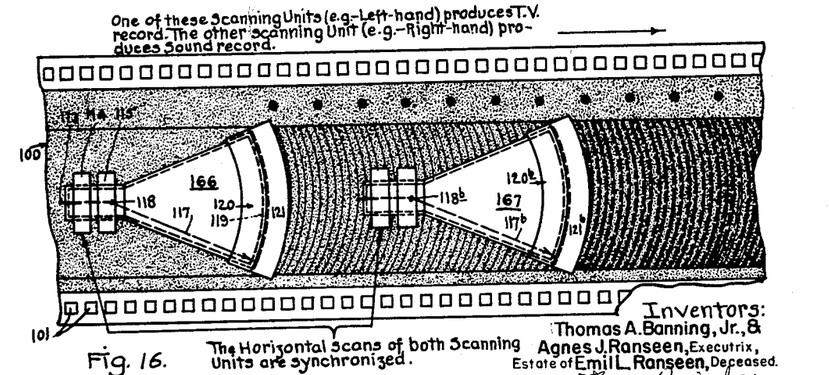
FIGURE 16 shows a view similar to that of FIGURE 15, but in FIGURE 16 the tape is shown as carrying cross scans of signal recordings for both a television picture record and for the accompanying sound record, superimposed on the picture recording, it being noted that the showing in FIGURE 16 is of a record producing set-up; and accordingly, in FIGURE 16 there are shown two recording heads, one for the picture signals, and the other for the sound signals, such two recording heads being displaced lengthwise along the tape, but in locations to produce (or sense) the sound record simultaneously with production (or sensing) of the picture record accompanying such sound record.

FIGURES 14, 15 and 16 show how recordings of audio programs may be produced by the cross-scanning of the tape. In FIGURE 14 such a recorded cross-scanned taped record is shown schematically, it being noted that in this figure there is not shown any lineal sound track, since the sound recordings are all produced by the cross-scanning. In FIGURE 15 the sensing head is shown in place above the record carrying tape of FIGURE 14, the direction of tape travel being as shown by the arrow.

In FIGURE 16 there is shown how a sound track may be imposed, by cross-scanning, on a picture recording, also produced by cross-scanning, since the audio signals may be picked up and isolated from the very high frequency picture signals, to pass the two groups of signals independently to proper forms of circuitry for further translation.

It is noted that, since the rate of cross-scanning may be very high (e.g. 15,750 c.p.s., for the case of scanning a conventional TV received picture, according to present rules of the F.C.C.), even such a high frequency audio reception as 15,750 c.p.s. would be received with a single full cross scan for each wave of such audio signal; and lower frequencies corresponding to lower audio notes, would require several or even many cross-scans for their recording. It is thus evident that even the most complex audio signals, those including various harmonics, may be very faithfully recorded by use of the cross-scanning arrangements herein disclosed.

Since each of the embodiments hereinbefore described is also fully illustrated and described in the parent case, Patent No. 2,976,354, issued March 21, 1961, it is deemed unnecessary to further describe the various embodiments of applications of the improved tapes in this case.

The alloy metal of molybdenum, substantially 4 percent, nickel, substantially 79 percent, and balance substantially all iron, possesses the following characteristics: coercive force, substantially 0.05 oersteds, $H_c$; saturation induction, substantially 8,000 gausses, $B_s$; saturation hysteresis, substantially 200 ergs/cm.$^3$; and maximum permeability, substantially 100,000. Such metal may be rolled under heavy pressure to a thinness of substantially one-eighth of a mil (.000125 inch). A convenient thickness of such a metal sheet is, therefore, of the order of one mil for the presently intended purposes; and when such a sheet of such thinness is backed by the high tensile strength highly flexible backing, such as a sheet of plastic, conveniently nylon, sufficient tensile strength and permanence of sheet form is ensured to meet the requirements imposed in magnetic tape recording operations. When such sheet is further provided with cross-wise extending ridges of small hight (of the order of a mil), extending parallel to each other, and spaced from each other along the length of the strip (measured in the direction of strip travel during recording or sensing operations), such ridges being spaced from each other at spacings equal to the intended lengthwise travel of the tape between cross-scans, such a tape constitutes a highly desirable form of medium to receive and retain the magnetic signals, with possibility of erasure of such signals when desired, by use of a conventional erasing medium operating on the basis of progressive reduction of the magnetic remainder by subjecting the tape at the location of the signal to a progressively reduced hysteresis effect until the magnetization is reduced substantially to zero.

What is claimed is:

1. As a new article of manufacture, a flexible tape for receiving records of signals, said records being magnetic variations of magnetic effect carried by said tape, said tape having a flexible magnetizable surface comprising the surface of a thin sheet of flexible alloy metal which alloy includes substantially 4 percent molybdenum and 79 percent nickel, said tape including a flexible strip of high tensile strength fabric mounting for said strip of alloy metal, and a flexible cementitious connection between the strip of high alloy metal and the said backing mounting, wherein there is provided a continuing series of ribs of said alloy metal extending across the general plane of said sheet of said metal and extending across a substantial portion of the width of said sheet of metal and all of the same shape and parallel to each other.

2. As a new article of manufacture, a flexible tape for receiving records of signals, said records being magnetic variations of magnetic effect carried by said tape, said tape having a flexible magnetizable surface comprising the surface of a thin strip of flexible alloy metal which alloy includes substantially 4 percent molybdenum and 79 percent nickel, said strip having a thickness of the order from substantially less than one mil to substantially five mils, together with signals carried by said surface in a progressive sequence of travel over said surface, said signals comprising variations of magnetism of said surface, wherein said strip of alloy metal is provided with a series of parallel equally spaced magnetic signal carrying ribs extending across a substantial portion of the width of the strip, and all of said ribs being of substantially equal height measured from the surface of the body of the strip.

3. An article as defined in claim 2, wherein said ribs are of arcuate form with the concave margins of all of the ribs facing in the same direction along the strip of alloy metal.

4. An article as defined in claim 2, wherein the height of the ribs above the surface of the body of the strip is of the order of substantially one mil.

(References on following page)

References Cited by the Examiner

UNITED STATES PATENTS

| | | | |
|---|---|---|---|
| 1,656,216 | 1/28 | Melby | 274—41.4 |
| 1,768,443 | 6/30 | Elmen | 75—170 |
| 1,949,840 | 3/34 | Languepin | 274—41.4 |
| 2,199,526 | 5/40 | McCowen | 274—41.4 |
| 2,443,756 | 6/48 | Williams et al. | 274—41.4 |
| 2,631,118 | 3/53 | Boothby et al. | 148—120 |
| 2,792,563 | 5/57 | Rajchman | 340—174 |

FOREIGN PATENTS 489,261   7/38   Great Britain.

OTHER REFERENCES

Magnetic Materials in the Electrical Industry, Bardell, 1960, MacDonald and Co., Ltd., London, pages 96–101, 105–107.

NORTON ANSHER, *Primary Examiner*.

D. G. REDINBAUGH, E. SAX, EMIL G. ANDERSON, *Examiners*.